United States Patent [19]

Weber

[11] 3,920,798
[45] Nov. 18, 1975

[54] ZEOLITE Y SYNTHESIS
[75] Inventor: Willis W. Weber, South Salem, N.Y.
[73] Assignee: Union Carbide Corporation, New York, N.Y.
[22] Filed: May 8, 1973
[21] Appl. No.: 358,358

[52] U.S. Cl. .............................................. 423/329
[51] Int. Cl.² .......................................... C01B 33/28
[58] Field of Search ..................................... 423/329

[56] References Cited
UNITED STATES PATENTS

| | | | |
|---|---|---|---|
| 3,101,251 | 8/1963 | Howell | 423/329 |
| 3,130,007 | 4/1964 | Breck | 423/329 |
| 3,343,913 | 9/1967 | Robson | 423/329 |
| 3,391,994 | 7/1968 | Haden et al. | 423/329 |
| 3,649,178 | 3/1972 | Wang et al. | 423/329 |
| 3,690,823 | 9/1972 | Young | 423/329 |

*Primary Examiner*—Oscar R. Vertiz
*Assistant Examiner*—Brian E. Hearn
*Attorney, Agent, or Firm*—Richard G. Miller

[57] ABSTRACT

Zeolite Y is produced in good yields of high purity by a hydrothermal process characterized by the use of high temperature aging and crystallization stages, the latter rapidly achieved by steam-sparging, followed by quick quenching of the reaction mass. The process makes an efficient utilization of a relatively inexpensive solid amorphous reactive silica as the silicon source in the reactant gel containing relatively low concentrations of water.

1 Claim, No Drawings

ZEOLITE Y SYNTHESIS

The present invention relates in general to a process for preparing zeolite Y and, more particularly, to the preparation of zeolite Y on a commercial scale using elevated temperatures and pressures for the crystallization stage followed by very rapid cooling of the reaction mass.

In the manufacture of zeolite Y, according to the method of this invention, the reactant mixtures or gels are formulated to make efficient use of the silica source. Such gels contain relatively low concentrations of water and are extremely viscous. Accordingly, great difficulty would ordinarily be encountered in uniformly mixing and heating large masses of such stiff reactive gels in order to prevent the formation of other and undesirable crystalline phases. Moreover, even though zeolite Y is initially produced from the gel, the product mass exhibits a tendency to degrade or convert to various other zeolite phases unless the reaction is stopped at the proper point. These undesirable reactions can be localized or they can occur generally throughout a substantial portion of the reaction mass. It has been found, therefore, that both rapid heating to the proper reaction temperature and rapid cooling at the end of the zeolite Y crystallization stage are necessary features of successful plant-scale synthesis. Unfortunately, in large-scale production heat transfer problems during heat-up and crystallization are intensified by the shell or coating of residue which often accumulates on the inside surfaces of the pressure crystallizers.

The process of the present invention offers a variety of improvements in the synthesis of zeolite Y. The gel formulations employed provide an efficient utilization of a relatively inexpensive solid amorphous reactive silica as the silicon-containing reagent. The high-temperature aging step helps minimize the time required for the subsequent steam heat-up operation. The use of high crystallization temperatures, rapidly achieved by steam sparging, reduces the overall batch process time to a minimum. Further, the conversion of newly formed zeolite Y crystals into other and unwanted crystal species is kept at a very low level by utilizing a particular quenching technique. Also, the prouct zeolite Y crystals are larger and thus more easily washed and filtered.

The foregoing improvements are obtained by means of the process which comprises (a) providing in a sealable reaction vessel a homogeneous aqueous aluminosilicate reaction mixture, the source of silica in said reaction mixture being a solid reactive amorphous silica, said reaction mixture having a composition expressed in terms of oxide-mole-ratios within the range:

$Na_2O/SiO_2$ —0.30–0.36
$SiO_2/Al_2O_3$ —8.0–11
$H_2O/Na_2O$ —16–35 (b) maintaining the said reaction mixture at a temperature within the range of 95°F to 160°F, preferably not greater than 140°F, for a period of from about 6 to 15 hours, preferably with agitation; (c) thereafter injecting steam into the reaction mixture in an amount and at a temperature sufficient to raise the temperature of the reaction mixture to the range of 230°F to 300°F while thereby increasing the water content of the reaction mixture not more than 15% based on the weight of the water originally present in said mixture; (d) maintaining for a period of from 4 to 20 hours under autogeneous pressure the reaction mixture at a temperature of from 240°F to 300°F; (e) rapidly decreasing the pressure over the reaction mass from autogeneous to atmospheric whereby a temperature decrease in said reaction mass of at least about 35°F is obtained over a period of not exceeding 10 minutes, preferably less than 5 minutes; and optionally (f) filtering and washing the reaction mass solid to recover the zeolite Y crystals.

The solid reactive amorphous silica suitably employed in the present invention can be any of such materials as fume silicas and chemically-precipitated silicas, preferably having a particle size of less than about 1 micron. These silicas are widely available commercially under such trade names as "Santocel," "Cab-O-Sil," and "Hi-Sil".

Compounds of aluminum which heretofore have been conventionally used to provide aluminum in reaction systems for preparing synthetic zeolite molecular sieves in general are also suitable in the practice of the present invention. Specifically, activated alumina, gamma alumina, alumina trihydrate, alpha alumina and sodium aluminate have all been found satisfactory reagents, with sodium aluminate being preferably employed.

The source of sodium is preferably sodium hydroxide and can be used either as the sole source or, when required, as a supplement to sodium introduced as sodium aluminate.

In combining the reactants to form the reaction system from which zeolite Y crystallizes, the order of mixing is not a critical factor. Preferably, however, to insure that the reaction system has a uniform composition throughout, it has been found desirable to form the final composition by admixing solid amorphous silica with a water solution of sodium aluminate. Where sodium aluminate is employed as the source of aluminum, the water solution thereof is formed simply by adding a portion of the overall required quantity of water thereto. Where alumina or aluminum trihydrate is to be used, however, the sodium aluminate solution may be prepared by dissolving the reagent in a water solution of sodium hydroxide at about 90°C. It is advantegeous to cool the sodium aluminate solution thus formed to about 30°C before admixture with the solid amorphous silica.

In prior known processes for preparing zeolite Y, it was conventional to age the reaction mixture by permitting it to remain quiescent at ambient room temperature, i.e. about 70°F for a period of about 8 to 48 hours. In the present process, however, the aging step is accomplished over a much shorter period, namely, 6 to 15 hours, using a much higher temperature range of preferably 95°F to 140°F and, in addition, the reaction mass is preferably agitated during the aging period. To raise the temperature of the reaction mixture up to the crystallization temperature of at least 240°F live steam under a pressure of about 15 psig is sparged directly into the gel using a sparging tube or plate, and agitating means to obtain substantially uniform temperatures in all parts of the gel. After the desired final gel temperature is attained, the agitation is terminated. During the steam sparging, and through the entire crystallization period, the pressure over the reaction mass is maintained at 12 psig or at autogeneous pressure, whichever is higher. In no event should the steam impart more than 15 percent additional water to the gel based on the weight of water in the original formulation. Preferably this water increase is kept below 10 percent.

Because of the very high crystallization temperatures utilized in this process, it is important that over-digestion be avoided. Accordingly, when a high yield of high purity zeolite Y is obtained in any one batch, the temperature should be quickly reduced by at least 35°F to quench the reaction. The determination of when optimum crystallization has occurred is accomplished routinely by periodic sampling of the reaction mass. A preferred technique is to utilize a standard X-ray powder diffraction pattern of a high purity zeolite Y sample presented on a spectrometer recorder chart. Working from the chart pattern, the summation of the peak heights $I_s$, i.e. the intensity of reflection of five selected characteristic and prominent diffraction peaks, is compared with the summation of the corresponding peak heights of the X-ray pattern of a sample taken from the reaction mass periodically. The degree of product crystallinity is thus determined by the relative intensity ratio $I/I_s$ wherein $I_s$ is the peak height summation of the standard and I is the peak height summation of the sample. Quenching of the reaction mass should be commenced when the $I/I_s$ ratio is as near to 1.0 as possible but, in any event, when the ratio is at least 0.85 or, preferably, 0.90.

Although quenching can be done by several conventional methods, it has been found to be highly advantageous to quickly lower the pressure over the reactant mass and expel this mass from the crystallizer to accomplish the desired result. In practice, the valve in the discharge line from the pressurized crystallizer vessel is opened and the contents thereof are suddenly expelled under pressure into an open vat, filter press or other collection vessel, thereby achieving a temperature drop of at least 35°F in preferably less than 5 minutes. The cooled reaction mass is sufficiently pure zeolite Y to be shaped or otherwise formed into useful catalyst or adsorbent bodies without the conventional filtering and washing, or these last two operations may be carried out to achieve even greater product purity if desired.

The invention is illustrated by the following example:

A reaction mixture for preparing zeolite Y is made up from reactive amorphous solid silica, 50% caustic solution, alumina trihydrate and water. The overall composition of this mixture in terms of molar ratios of the components as oxides was: $Na_2O/SiO_2 = $ 0.36; $SiO_2/Al_2O_3 = $ 9.83; $H_2O/Na_2O = $ 22.3. The mixed gel was aged while being gently agitated for 10 hours at 100°F. The contents of the sealed steam-jacketed digester were brought up to temperature of 244°F by steam lancing for 1 hour, using 15 psig steam through a sparging lance. Vessel pressure of 12 psig and reaction temperature of 245°–248°F were maintained for 15 hours. At this point, the steam supply to the crystallizer jacket was cut off. Next, the discharge valve from the bottom of the crystallizer was opened. The hot product mass was quickly expelled into the collection tank below. The weight increment of water contributed to the reaction mass by the use of the steam lance was 10 percent, based on the weight of water originally present in the reaction mixture. The solid product was separated from the liquor by filtration and washing. A sample of the washed filter cake was examined by X-ray analysis; the molar $SiO_2/Al_2O_3$ ratio of the Type Y, based on determination of the unit cell constant $a_o$, was 4.75. The dry weight of zeolite Y product recovered was 320 pounds.

What is claimed is:

1. Process for the production of Zeolite Y which comprises (a) providing in a reaction vessel a homogeneous aqueous aluminosilicate mixture, the source of silica in said reaction mixture being a solid reactive amorphous silica, said reaction mixture having a composition expressed in terms of oxide-mole ratios within the range:

| | |
|---|---|
| $Na_2O/SiO_2$ | 0.30–0.36 |
| $SiO_2/Al_2O_3$ | 8.0–11 |
| $H_2O/Na_2O$ | 16–35 |

(b) maintaining the said reaction mixture at a temperature within the range of 95°F to 160°F for a period of from about 6 to 15 hours; (c) thereafter injecting steam into the reaction mixture in an amount and at a temperature sufficient to raise the temperature of the reaction mixture to the range of 240°F to 300°F while increasing the water content of the reaction mixture not more than 15% based on the weight of the water originally present; (d) maintaining for a period of from 4 to 20 hours under autogeneous pressure the reaction mixture at a temperature of from 240°F to 300°F; (e) rapidly decreasing the pressure over said reaction mass from autogeneous to atmospheric whereby a temperature decrease in the reaction mass of at least about 35°F is obtained over a period not exceeding 10 minutes.

* * * * *